(12) United States Patent
Brandl et al.

(10) Patent No.: US 12,306,205 B2
(45) Date of Patent: May 20, 2025

(54) METHOD AND SYSTEM FOR ESTIMATING AERODYNAMIC ANGLES OF A FLYING BODY

(71) Applicant: POLITECNICO DI TORINO, Turin (IT)

(72) Inventors: Alberto Brandl, Turin (IT); Piero Gili, Turin (IT); Angelo Lerro, Turin (IT)

(73) Assignee: POLITECNICO DI TORINO, Turin (IT)

( * ) Notice: Subject to any disclaimer, the term of this patent is extended or adjusted under 35 U.S.C. 154(b) by 293 days.

(21) Appl. No.: 17/777,082

(22) PCT Filed: Jan. 11, 2021

(86) PCT No.: PCT/IB2021/050157
§ 371 (c)(1),
(2) Date: May 16, 2022

(87) PCT Pub. No.: WO2021/140491
PCT Pub. Date: Jul. 15, 2021

(65) Prior Publication Data
US 2023/0003758 A1 Jan. 5, 2023

(30) Foreign Application Priority Data
Jan. 10, 2020 (IT) .......................... 102020000000331

(51) Int. Cl.
*G01P 13/02* (2006.01)
*B64D 43/00* (2006.01)
(Continued)

(52) U.S. Cl.
CPC ............ *G01P 13/025* (2013.01); *B64D 43/00* (2013.01); *G01P 15/14* (2013.01); *G01P 15/18* (2013.01)

(58) Field of Classification Search
CPC ....... B64D 43/00; G01P 13/025; G01P 15/14; G01P 15/18; G05D 1/0825
See application file for complete search history.

(56) References Cited

U.S. PATENT DOCUMENTS

| 4,046,341 A | 9/1977 | Quinlivan |
| 2005/0090947 A1* | 4/2005 | Wise ..................... G01P 13/025 701/4 |

FOREIGN PATENT DOCUMENTS

| EP | 1480043 A1 | 11/2004 |
| RU | 2016142383 A | 4/2018 |
| WO | 2015008308 A2 | 1/2015 |

OTHER PUBLICATIONS

AD869887, J.B. Dendy, et al., Angle-of-Attack Computation Study, Technical Report AFFDL-TR-69-93, 1969, pp. 1-107.

* cited by examiner

*Primary Examiner* — Charles J Han
(74) *Attorney, Agent, or Firm* — Bayramoglu Law Offices LLC (57) ABSTRACT

A computer implemented method for estimating angles of attack and/or an angle of sideslip of a flying body includes the steps of: providing data or measurements representative of a time derivative of a module of a speed of the flying body with respect to an air; providing data or measurements representative of corresponding projections of coordinate accelerations on a Cartesian reference frame fixed to the flying body; and calculating the angles of attack and/or the sideslip on a basis of an mathematical relationship of the angles of attack and the sideslip with the coordinate accelerations and the time derivative of the module of the speed of the flying body with respect to the air.

1 Claim, 4 Drawing Sheets

(51) Int. Cl.
*G01P 15/14* (2013.01)
*G01P 15/18* (2013.01)

METHOD AND SYSTEM FOR ESTIMATING AERODYNAMIC ANGLES OF A FLYING BODY

CROSS REFERENCE TO THE RELATED APPLICATIONS

This application is the national stage entry of International Application No. PCT/IB2021/050157, filed on Jan. 11, 2021, which is based upon and claims priority to Italian Patent Application No. 102020000000331 filed on Jan. 10, 2020, the entire contents of which are incorporated herein by reference.

TECHNICAL FIELD

The present invention refers to a method for estimating the aerodynamic angles, i.e. angle of attack and angle of sideslip, of a flying body, based on the numerical or analytical solution of an equation or system of equations. This method is applicable on board the flying body, e.g. an aircraft, using on board sensors and electronic devices to perform calculations in real time, or on the ground. In the latter case, it is possible to use the method in a flight diagnostics step based on data stored during a flight, or the method can be integrated into a flight simulator, for example for ground training, based on data generated artificially and not measured e.g. the wind. The use of artificially generated wind data is for example in computerized flight simulators for e.g. train a pilot.

BACKGROUND

One of the causes of aircraft accidents is the loss of control due to the erroneous/non-detection of aircraft stall conditions.

It is known to provide an aircraft with a detection system comprising sensors e.g. flow angle vanes, pressure sensors, multifunction probe, etc. and at least one processing unit for processing data measured by sensors and calculating aerodynamic angles. Such systems require careful maintenance, e.g. against residues of dirt or ice, in particular of moving parts, where applicable. Furthermore, a calibration on board the aircraft is always required.

To obviate these drawbacks, it is known, albeit in experimental applications, to estimate the aerodynamic angles indirectly by means of analytical estimators or virtual sensors or synthetic sensors. For example, WO-A1-2015008308 describes a method for estimating the angle of attack and/or sideslip by exploiting aerodynamic and inertial data on the basis of a pressure sensor and an accelerometric measurement system for the axial values of inertial and pitching acceleration of the aircraft. Based on these data, the method estimates the aerodynamic angles as a function of the measured dynamic pressure, of an elevation angle (e.g. trim of the aircraft's roll axis with respect to the horizon which can be derived from the measurement of a pitch rate in particular cases with respect to the pitch axis by the accelerometric measurement system) and an inertial vertical speed (e.g. calculated on the basis of the static pressure measured by the sensor or by a GPS). Alternatively or in combination, the aerodyanmic angles is estimated on the basis of the measured dynamic pressure and the inertial acceleration component of the aircraft along the yaw axis. Furthermore, the mathematical expression of the angles of attack and sideslip respectively presents an explicit form of mathematical relation with quantities dependent on the body in flight, such as the characteristic weight of the body itself, and constants calculated during a calibration phase.

This method requires, in fact, an on-board calibration of virtual sensors necessary for the solution through a neural network that works as a non-linear regressor. If this calibration is not appropriately limited, unmapped conditions are extrapolated during calibration.

It is also known in the 'Angle of attack computation study' of 1969, US Air Force calculate in zero wind conditions one of the angles of attack and sideslip by measuring the other angle, together with the projections on the three axes of roll, pitch and yaw of the inertial acceleration in the inertial frame of reference, in addition to the vertical velocity, $\dot{V}_\infty$ and $V_\infty$. This approach is defined, in the publication itself, as unsuitable for providing precise results. Indeed, the initial hypothesis of validity in the absence of wind is impractical. Furthermore, the further hypothesis of linearizing the equations to obtain the solution, severely limits the applicability of the formula in a real case since the solution would be precise only in very limited cases.

SUMMARY

The scope of the present invention is to provide a method and a system for accurately estimating the angle of attack and/or sideslip angle and at the same time based on a reduced number of data measured directly by sensors, in order to simplify the on-board instrumentation, which for the purpose of the invention can be reduced to the sole unit of inertial measurements and to a device for measuring the speed of the flying body with respect to the air, and which is generic for any flying body, i.e. it does not require calibration e.g. with one or more characteristic data of the particular flying body.

The scope of the present invention is achieved by a computer based estimation method comprising the steps of:

Providing direct or indirect measurements or data of a time derivative of an airspeed (module or magnitude of the velocity vector) of the flying body with respect to the air (V) e.g. time derivative of true airspeed, this parameter can be calculated for example starting from the direct measurement of an indicated speed of the flying body, for example through a dynamic pressure sensor such as a Pitot tube that directly measures both total and static pressure;

Providing measurements or data of the corresponding projections on the Cartesian reference frame of the body acceleration herein defined coordinate acceleration, i.e. inertial acceleration expressed in a 'body' reference frame e.g. aircraft body axes with the exception of the effects of the gravitational field;

Calculating the angles of attack ($\alpha$) and/or sideslip ($\beta$) based on an explicit mathematical relationship between said angles, said coordinate accelerations and said time derivative of a speed with respect to the air.

According to the present invention, the development of the formulas of the air data system and of the inertial data system has shown that there is a scheme based on a small number of parameters that can be easily measured with on-board sensors to express the relationship between the angles of attack and sideslip. In particular, the accuracy of the mathematical relationship is good when time derivative of the true airspeed with respect to the air (time derivative of true airspeed, TAS) is used but it is also possible to accept approximations including the use of calibrated airspeed (i.e. the time derivative of calibrated airspeed, CAS) and the equivalent one (i.e. the time derivative of the equivalent airspeed, EAS), for example when the effects of the altitude are negligible but it is also possible to accept approximations including the use of the indicated airspeed (i.e. the time derivative of the indicated airspeed, IAS), for example when they are negligible the effects of the quota and the error of the measuring instrument. It is important to stress that the proposed approach, via development of flight mechanics equations, demonstrates the importance of coordinate acceleration and time derivative of airspeed as key input parameters for aerodynamic angle calculation. In particular, according to an embodiment, airspeed, e.g. true airspeed, is measured via a dynamic pressure sensor, and then a time derivative of airspeed is calculated from such a measure to provide an input for the calculation of the aerodynamic angles.

It is also possible to measure indirectly the parameters of the direct formula. For instance, according to an embodiment of the invention, the explicit formula e.g. the above mentioned equation, can be used to estimate unknown flight parameters from known ones, e.g. the time derivative of the module of a speed can be estimated when data representative of aerodynamic angles and coordinate accelerations are received. For example aerodynamic angles may be measured by dedicated sensors.

Resulting from the development of flight mechanic formulas applied to the flying body reduced to a single point mass, e.g. the center of gravity, the present method is applicable to any flying body, including e.g. aircraft, airships, paragliders, etc. without requiring calibration procedures or data referring to the particular model of flying body. Furthermore, after applying the suitable gravitational field, the present method is also applicable to satellites or other flying bodies in atmospheres other than the terrestrial one.

An advantage of providing an explicit formula backed by theoretical elaboration of flight mechanic equations helps to provide a precise and at the same time faster numerical solution to solve for angle of attack and/or angle of sideslip.

This is particularly evident in case of certain hypotheses, e.g. when linearization is acceptable. The scheme based on the proposed solution, according to some embodiments, avoids any learning or modelling steps where the precision of the solution is often affected by accuracy of the learning step or the aircraft model. Indeed, as shown below, by applying reasonable approximations, flight mechanics equations were rearranged to obtain formulas expanded in time domain that, in some cases, can be analytically solved. Furthermore, the proposed approach favors the achievement of the aircraft certification because it is possible to be compliant to applicable airworthiness regulations. Lastly, the proposed solution contains only kinematic parameters of the flying body and, therefore, it is not affected by current flight conditions, configuration or mass distribution of the flying body and provides a 'model-free' approach to the calculation of aerodynamic angles. In fact, the proposed solution does not require to any modeling of the six-degree-of-freedom dynamics and/or the geometry and/or the mass and/or aerodynamics, propulsion forces and moments including buoyancy forces, flight control commands, including models in linear or non-linear state space form etc., e.g. such as when a firefighting plane releases a fire extinguishing liquid during a mission.

Once calculated, such angles have a number of applications, for instance:

Visualization of the angle of attack and/or the angle of sideslip on a display. The same is applicable in case of a flight simulator;

An electronic control system implementing the method of the invention may be programmed to receive a threshold value of at least one of the angles of attack and/or sideslip and compare the calculated value with such a threshold: in case the threshold is reached a warning message is generated, e.g. visual message on the display and/or an acoustic message. This is applicable as well in case of a flight simulator;

The electronic control system may comprise an actuator, e.g. an actuator of an aerodynamic control surface or the like; or an actuator of a seat, joystick or other feedback device, in particular haptic feedback device, and the control system is programmed to power the actuator according to a certain control law;

Calculations, i.e. estimations, of the aerodynamic angles are executed a number of times, e.g. periodically, during a flight mission and the calculated values are stored in a memory device and/or wirelessly transmitted to a receiver, e.g. a flight control base;

According to a preferred embodiment of the present invention, measurements of a wind acceleration ($\dot{w}_B$) in body axes are also provided, i.e. integral with the flying body, and said explicit mathematical formula also includes wind acceleration.

The exact formula, i.e. with the utmost precision, also includes a term relating to a wind acceleration, $\dot{w}_B$. This acceleration can be estimated by indirect measurements as a numerical derivative of the wind vector, $w_B$. Neglecting this term, i.e. as discussed in the previous paragraph, constitutes an assumption commonly applied with the achievement of reasonably accurate results, for example in the case of null, constant wind or with negligible variations.

According to a preferred embodiment of the present invention, the explicit mathematical relationship is:

$$a_x \cos\beta\cos\alpha + a_y \sin\beta + a_z \cos\beta\sin\alpha = \dot{V}$$

wherein:
  $a_i$ are coordinate or body accelerations of the body; and
  $\dot{V}$ is the time derivative of an airspeed of the body with respect to the air.

It is possible to directly measure the coordinate accelerations in the 'body' reference frame through a derivative of the speed of the body with respect to a system considered inertial, e.g. the GPS speeds, or calculate these accelerations by measuring the inertial accelerations on board through $a_i = n_i - C_{12B} g$, e.g. through an inertial measurement device IMU comprising gyroscopes and accelerometers to measure the inertial accelerations n and indirectly measure, through the gyroscopes, the Euler angles since $C_{12B} = f(\psi, \theta, \varphi)$, i.e. Euler angles of heading, elevation and bank, and g is the gravitational acceleration.

Proper or inertial accelerations are measured with respect to a local frame in free fall. For relativistic reasons, an on-board accelerometer measures the proper accelerations and not the coordinate ones.

Furthermore, this equation instantly provides the value of one of the known angles to the other, for example when the angle of attack is measured or estimated using a known method, e.g. flow angle vane, or the angle of sideslip is measured or estimated by a known method, e.g. flow angle vane or multi-hole pressure probes. It is also possible to solve the equation by considering both angles as unknowns without however requiring any calibration.

According to a preferred embodiment of the present invention, the steps of providing include respective steps of measuring by means of on-board measurement systems of the aircraft, such as the inertial measurement device indicated above and a system for measuring the speed of the body with respect to the external air for example comprising a dynamic pressure measuring device for measuring the indicated speed. If it is necessary to calculate the true airspeed and the corresponding time derivative, an air temperature sensor must also be provided. Alternatively or in combination it is also possible to use a magnetometer, e.g. as a reference for the integration of angular velocities for the purpose of calculating the Euler angles, and/or an electronic localization system e.g. GPS. In space applications it is particularly useful to be able to calculate the necessary parameters without the use of GPS.

It should be noted that the formula of the invention does not require the measurement or estimation of the vertical speed nor of the inertial acceleration as such, i.e. without relation to the Euler angles and the acceleration of gravity, (eg. from a GPS), otherwise required by other known systems.

According to a preferred embodiment, the method comprises the step of providing measurements of the respective projections on the Cartesian 'body' reference frame of the angular velocities of the flying body ($\Omega = f(\omega)$, where $\omega = [p, q, r]^T$) and the explicit mathematical relation is a system with a form of time derivative modulus, e.g.

$$\dot{V}_\infty = \frac{v_B^T \dot{v}_B}{V_\infty}$$

wherein a definition of coordinate acceleration is replaced as a derivative in a non-inertial reference frame, e.g. $\alpha_B = \dot{v}_B + \omega \wedge v_B$, wherein the aerodynamic angles are always referred to the time t while the other parameters are either measured at the time t or referred to the t−Δt, and therefore known. From this derives the possibility of obtaining different equations (referring to different time instants t, t−Δt, etc.) wherein the sole unknowns are the two aerodynamic angles referred to the current time instant t. When the system is not linearized, it may be useful to add as many time instants to which as many equations correspond.

The system thus obtained can be solved numerically, as it is non-linear, to obtain the value of the aerodynamic angles or be linearized and, in this case, there is an analytical solution that has given results with acceptable errors.

According to a preferred embodiment, the explicit mathematical expression can be used in parallel to a known estimation system, e.g. comprising a flow angle vane, the angle of sideslip and/or attack and, if the result of the mathematical expression is too different from that calculated using the known estimation system, generate an alert signal. Several diversity criteria are applicable, e.g. a threshold constant over time, or a threshold exceeded for a predetermined time interval or a more general check, for example on the basis of stored data, whether the calculated angles are compatible with the flight condition at the time of the estimate.

Other advantages of the present invention are discussed in the description and cited in the dependent claims.

BRIEF DESCRIPTION OF THE DRAWINGS

The invention is described below on the basis of non-limiting examples illustrated by way of example in the accompanying figures, which refer respectively to.

DETAILED DESCRIPTION OF THE EMBODIMENTS

The present invention considers the following definitions, in which a bold lowercase letter refers to a vector quantity, a bold capital letter refers to a matrix quantity and a lowercase or capital letter to a scalar:

inertial velocity vector in the inertial reference frame: $v_I = [u_i, v_i, w_i]^T$ velocity vector with respect to the wind, i.e. surrounding air, in the 'body' reference frame: $v_B = [u, v, w]^T$ wind velocity vector in the inertial reference frame: $w_I = [u_{wi}, v_{wi}, w_{wi}]^T$ With reference to the Euler angles, $\psi$, $\theta$, $\varphi$, the following rotation matrices are defined to switch from an inertial reference system to a Body reference frame on board the aircraft:

$$C_\psi = \begin{bmatrix} \cos(\psi) & \sin(\psi) & 0 \\ -\sin(\psi) & \cos(\psi) & 0 \\ 0 & 0 & 1 \end{bmatrix},$$

$$C_\theta = \begin{bmatrix} \cos(\theta) & 0 & -\sin(\theta) \\ 0 & 1 & 0 \\ \sin(\theta) & 0 & \cos(\theta) \end{bmatrix},$$

$$C_\phi = \begin{bmatrix} 1 & 0 & 0 \\ 0 & \cos(\phi) & \sin(\phi) \\ 0 & -\sin(\phi) & \cos(\phi) \end{bmatrix}$$

and the following known relation:

$$C_{I2B} = C_\phi C_\theta$$

$$C_\psi == \begin{bmatrix} \cos\theta\cos\psi & \cos\theta\sin\psi & -\sin\theta \\ \sin\phi\sin\theta\cos\psi - \cos\phi\sin\psi & \sin\phi\sin\theta\sin\psi + \cos\phi\cos\psi & \sin\phi\cos\theta \\ \cos\phi\sin\theta\cos\psi + \sin\phi\sin\psi & \cos\phi\sin\theta\sin\psi - \sin\phi\cos\psi & \cos\phi\cos\theta \end{bmatrix}$$

Figure 1:
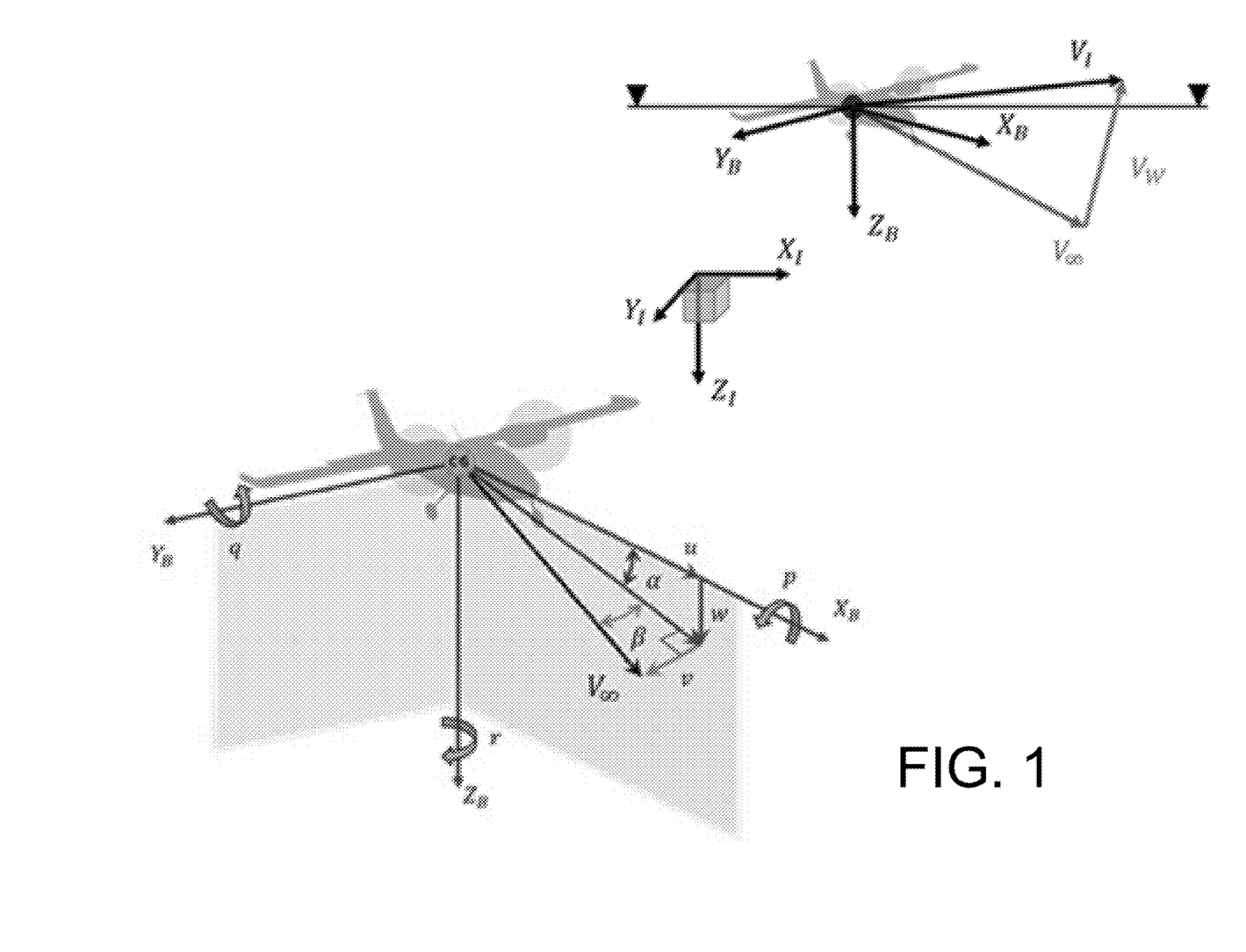
FIG. 1: Cartesian reference frames useful for the mathematical definitions of parameters used in the method according to the invention.

Referring to FIG. 1, the following definition of the aircraft velocity vector applies, in which the subscript 'I' refers to an inertial Cartesian reference frame:

The wind speed and direction $w_I$ is ideally estimated for example from meteorological data or calculated through an on-board system, e.g. known air data system with vanes and with the speed measured or obtained in an inertial frame, e.g. using data from a satellite global positioning system (GPS).

In the present description the wind is measured in the inertial Cartesian reference frame. Nothing prohibits to consider the wind in Cartesian body reference frame and therefore using the $w_B$ notation. The transition from one to the other is obtained by means of a rotation matrix that uses the Euler angles. In order not to burden the following discussion, we prefer to consider the wind measured or estimated in inertial axes, $w_I$.

Furthermore, the following definitions of acceleration vectors in the Body and Inertial reference frames are valid:

$$a_B = \left(\frac{dv_I}{dt}\right)_B = C_{I2B}\dot{v}_I = \dot{v}_B + \Omega_B v_B + C_{I2B}\dot{w}_I$$

and $$a_I = \left(\frac{dv_I}{dt}\right)_I = \left(\frac{dC_{B2I}v_B}{dt}\right)_I + \left(\frac{dw_I}{dt}\right)_I \Rightarrow$$

$$\dot{v}_I = C_{B2I}\dot{v}_B + \dot{C}_{B2I}v_B + \dot{w}_I \Rightarrow$$

$$\dot{v}_I = C_{B2I}(\dot{v}_B + C_{I2B}\dot{C}_{B2I}v_B) + \dot{w}_I \Rightarrow$$

$$\dot{v}_I = C_{B2I}(\dot{v}_B + \Omega_B v_B) + \dot{w}_I$$

where $$\Omega_B = \begin{bmatrix} 0 & -r & q \\ r & 0 & -p \\ -q & p & 0 \end{bmatrix}$$

where p, q and r are respectively the components in the body reference frame of the aircraft angular velocity measured for example by the onboard gyroscopes.

Simplified Solution for Time t

The following relationship is also valid, introducing the angles of attack, $\alpha$, and sideslip, $\beta$:

$$v_B = V_\infty[\cos\beta\cos\alpha, \sin\beta, \cos\beta\sin\alpha]^T = V_\infty \hat{i}_B$$

Considering the equations of speed and acceleration in the body reference frame and $$\dot{V}_\infty = \frac{v_B^T \dot{v}_B}{V_\infty},$$

i.e. a time derivative of an airspeed, the result is:

$$\dot{V}_\infty V_\infty = v_B^T \dot{v}_B = v_B^T(a_B - \Omega v_B - C_{I2B}\dot{w}_I) == v_B^T a_B - v_B^T\Omega v_B - v_B^T C_{I2B}\dot{w}_I ==$$

$$V_\infty \hat{i}_B^T(a_B - C_{I2B}\dot{w}_I) \Rightarrow \dot{V}_\infty = \hat{i}_B^T(a_B - C_{I2B}\dot{w}_I).$$

The above equation, for the purpose of a solution for the calculation of the aerodynamic angles included in the term $\hat{i}_B^T$, can be further simplified by assuming that in the time interval the acceleration of the wind is zero or by assuming a pre-defined wind speed variation on the basis of estimates of the same aerodynamic angles relative to previous time instants for each considered time interval. Such assumptions are quite common and allow for relatively high precision calculations in a generic flight condition. The hypothesis of negligible wind variation, $\dot{w}_I \approx 0$, provides exact results in constant (or null) wind conditions and acceptable results in moderately variable wind conditions.

Following this assumption, $\dot{w}_I \approx 0$, the following formula valid in a generic time t is obtained:

$$a_x \cos\beta\cos\alpha + a_y \sin\beta + a_z \cos\beta\sin\alpha = \dot{V}_\infty \quad \text{EQ. 1}$$

which provides an explicit correlation between the angles of attack and sideslip to directly or indirectly measurable quantities, i.e. aircraft time derivative of an airspeed with respect to the air (calculable through a conventional air data system) and the coordinate accelerations expressed in the body reference frame (measured with respect to an inertial reference system, e.g. GPS or calculated by means of an inertial measurement device) and the angles of Euler obtained starting from the measurements of the gyroscopes of the inertial measurement device). For the sake of simplicity, the time derivative of the true airspeed is taken into consideration below, since according to their respective assumptions, the time derivative of indicated, measured and equivalent airspeeds respectively obtained from the IAS, CAS and EAS speeds can also be considered. Examples of calculation of the time derivative are:

$$\dot{V}_\infty = \frac{V_{\infty,t} - V_{\infty,t-\Delta t}}{\Delta t}$$

$$\dot{V}_\infty = \frac{V_{\infty,t+\Delta t} - V_{\infty,t-\Delta t}}{2\Delta t}$$

According to a first embodiment of the present invention, it is possible to calculate one of the two angles $\alpha$ and $\beta$ when the other is known, for example when the angle of attack is measured with known systems.

In fact, expressing the sine and cosine through the known parametric formulas.

$$\sin\beta = \frac{2t}{1+t^2}$$

$$\cos\beta = \frac{1-t^2}{1+t^2}$$

Where $$t = \tan\frac{\beta}{2}$$

with $\beta \neq \pi + 2k\pi$, $k \in \mathbb{Z}$

It is therefore possible to write:

$$(a_x\cos\alpha + a_z\sin\alpha)\cos\beta + a_y\sin\beta = A\cos\beta + B\sin\beta = \frac{1-t^2}{1+t^2}A + \frac{2t}{1+t^2}B =$$

$$\dot{V}_\infty = C \Rightarrow (1+t^2)C = (1-t^2)A + 2Bt \Rightarrow (C+A)t^2 - 2Bt + (C-A) = 0$$

Out of the two possible solutions of such second order equations, the most realistic one is selected; if there are two close solutions, the selected one is that minimizing the time derivative with respect to the preceding step.

The possible analytic solution of angle $\alpha$ from a, $\dot{V}_\infty$ e $\beta$ is similar to what is shown previously.

For instance, the formula to calculate the angle of attack from the angle of sideslip is:

$$\alpha = 2\tan^{-1}\frac{a_Z\cos\beta \pm \sqrt{(a_Z\cos\beta)^2 - \left[(\dot{V}_\infty - a_Y\sin\beta)^2 - (a_X\cos\beta)^2\right]}}{\dot{V}_\infty - a_Y\sin\beta + a_X\cos\beta}$$

Figure 3A:
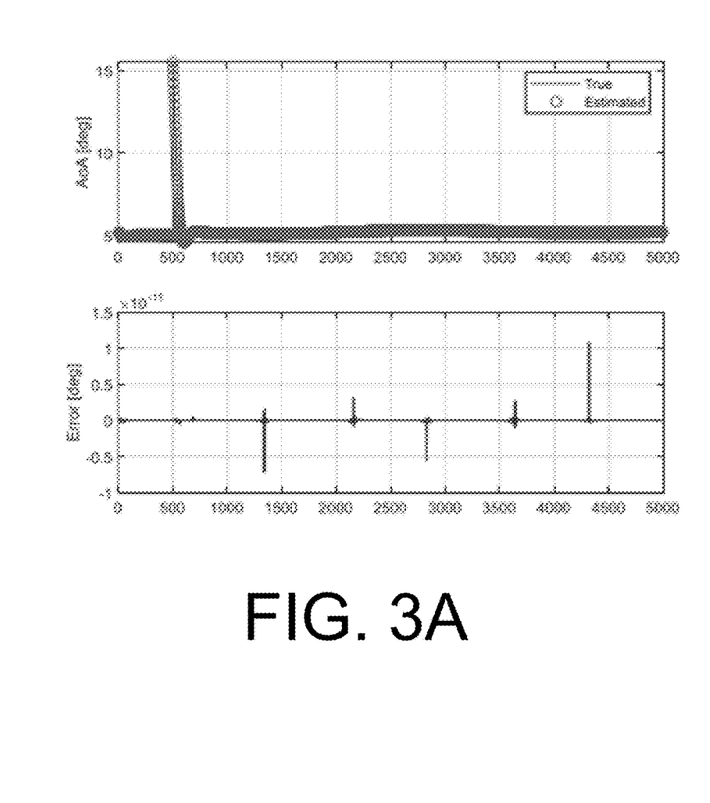
FIG. 3A: graphs showing the overlap between the theoretical results (solid line) and the numerical results according to the present invention (circles) for a first solution form.
Figure 3B:
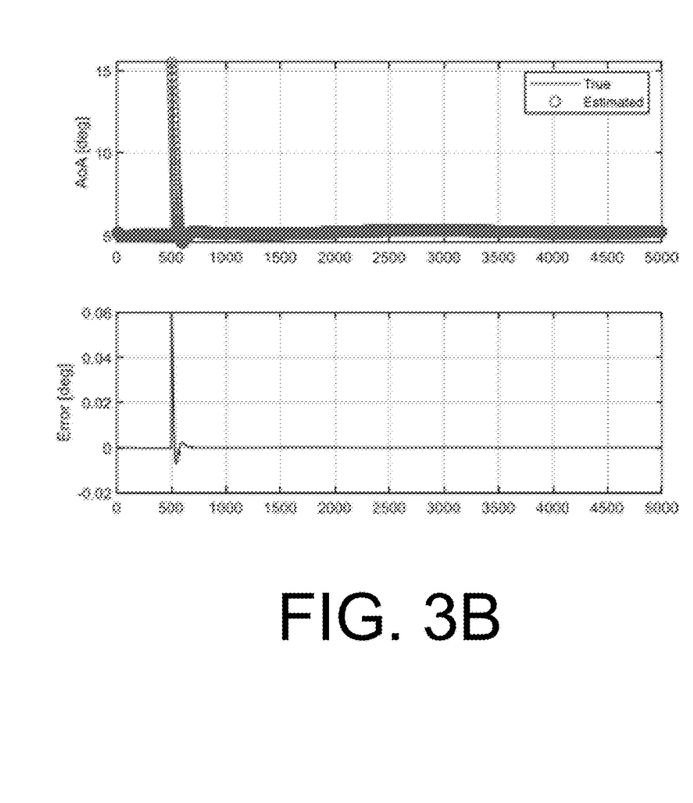
FIG. 3B: graphs showing the overlap between the theoretical results (solid line) and the numerical results according to the present invention (circles) for a second solution form.

Furthermore, it is possible to approximate the sine with the angle and the cosine to 1 and $$\alpha_{lin} = \frac{\dot{V}_\infty - a_X\cos\beta - \alpha_Y\sin\beta}{a_Z\cos\beta}$$

thus to obtain a linearized form:

FIGS. 3A and 3B compare the numerical results obtained by applying the two formulas, i.e. nonlinear (left) and linearized (right) of the angle of attack shown above, where the angle of sideslip is known from a conventional system of measurement of the latter angle. The comparison data (in continuous line) are obtained from the solution of linearized longitudinal dynamic differential equations of a known aircraft.

Referring to the angle of sideslip, formulas obtained similarly to those of the angle of attack are:

$$\beta = 2\tan^{-1}\frac{a_Y\sqrt{a_Y^2 - \left(\dot{V}_\infty^2 - a_X^2\cos^2\alpha - a_Z^2\sin^2\alpha\right)}}{\dot{V}_\infty + a_X\cos\alpha + a_Z\sin\alpha}$$

and $$\cdot \beta_{lin} = \frac{\dot{V}_\infty - (a_X\cos\alpha) - (a_Z\sin\alpha)}{a_Y}$$

As indicated by the above formulas, the aerodynamic angles can only be calculated in the case of non-zero coordinate acceleration. In case of hovering, i.e. with zero coordinated acceleration, a respective value of the angles calculated in the last instant of time in which the coordinate acceleration is different from zero is stored and kept until the coordinated acceleration returns to be different from zero.

It is also possible to solve the equation for both angles.

General Time Domain Solution

Preferably, considering a term as an integration over time of an acceleration to obtain the speed:

$$v_B(t) = v_{B,t-\Delta t} + \int_{t-\Delta t}^{t} \dot{v}_B \, dt = v_{B,t-\Delta t} + \int_{t-\Delta t}^{t}(a_B - \Omega_B v_B - C_{I2B}\dot{w}_I)dt ==$$
$$v_{B,t-\Delta t} + \int_{t-\Delta t}^{t} a_B \, dt - \int_{t-\Delta t}^{t} \Omega_B v_B \, dt - \int_{t-\Delta t}^{t} C_{I2B}\left(\frac{dw_I}{dt}\right)_I dt$$

and remembering the complete formula of the scalar derivative expressed in time t−Δt:

$$V_{\infty,t-\Delta t}\dot{V}_{\infty,t-\Delta t} == \left[v_B(t) - \int_{t-\Delta t}^{t} a_B dt + \int_{t-\Delta t}^{t} \Omega_B v_B dt + \int_{t-\Delta t}^{t} C_{I2B}\left(\frac{dw_I}{dt}\right)_I dt\right]^T$$
$$(a_B - C_{I2B}\dot{w}_I)_{t-\Delta t} \Rightarrow \Rightarrow$$
$$V_{\infty,t-\Delta t}\dot{V}_{\infty,t-\Delta t} + \left[\int_{t-\Delta t}^{t} a_B dt - \int_{t-\Delta t}^{t} C_{I2B}\left(\frac{dw_I}{dt}\right)_I dt\right]^T (a_B - C_{I2B}\dot{w}_I)_{t-\Delta t} ==$$
$$\left[v_B(t) + \int_{t-\Delta t}^{t} \Omega_B v_B dt\right]^T (a_B - C_{I2B}\dot{w}_I)_{t-\Delta t}$$

According to a first approximation (which ultimately leads to a numerically solvable definition of the problem):

$$\int_{t-\Delta t}^{t} \Omega_B v_B dt = (\Omega_B v_B)_t \Delta t$$

the expression becomes:

$$V_{\infty,t-\Delta t}\dot{V}_{\infty,t-\Delta t} +$$
$$\left[\int_{t-\Delta t}^{t} a_B dt - \int_{t-\Delta t}^{t} a_B dt - \int_{t-\Delta t}^{t} C_{I2B}\left(\frac{dw_I}{dt}\right)_I dt\right]^T (a_B - C_{I2B}\dot{w}_I)_{t-\Delta t} ==$$
$$[v_{B,t} + \Omega_{B,t} v_{B,t}\Delta t]^T (a_B - C_{I2B}\dot{w}_I)_{t-\Delta t} = \left[v_{B,t}^T + (\Omega_{B,t} v_{B,t})^T \Delta t\right]$$
$$(a_B - C_{I2B}\dot{w}_I)_{t-\Delta t} = V_{\infty,t}\hat{i}_{B,t}^T (I - \Omega_{B,t}\Delta t)(a_B - C_{I2B}\dot{w}_I)_{t-\Delta t}$$

It is possible to apply even higher order schemes to approximate $v_{B,t-\tau}$.

For example, if the $v_{B,t-\tau} = v_{B,t} - \dot{v}_{B,t}^T$ integral is:

$$\int_{t-\Delta t}^{t} \Omega_B v_B dt = \Omega_{B,t}\int_{t-\Delta t}^{t}(v_{B,t} - \dot{v}_{B,t}\tau)dt$$
$$= \Omega_{B,t} v_{B,t}\Delta t - \Omega_{B,t}\dot{v}_{B,t}\frac{\Delta t^2}{2}$$

and, substituting in the general expression:

$$V_{\infty,t-\Delta t}\dot{V}_{\infty,t-\Delta t} + \left[\int_{t-\Delta t}^{t} a_B dt - \int_{t-\Delta t}^{t} C_{I2B}\left(\frac{dw_I}{dt}\right)_I dt\right]^T (a_B - C_{I2B}\dot{w}_I)_{t-\Delta t} ==$$
$$\left[v_{B,t} + \Omega_{B,t} v_{B,t}\Delta t - \Omega_{B,t}(a_B - \Omega_B v_B - C_{I2B}\dot{w}_I)_t\frac{\Delta t^2}{2}\right]^T$$
$$(a_B - C_{I2B}\dot{w}_I)_{t-\Delta t} \Rightarrow \Rightarrow V_{\infty,t-\Delta t}$$
$$\dot{V}_{\infty,t-\Delta t} ++\left[\int_{t-\Delta t}^{t} a_B dt - \int_{t-\Delta t}^{t} C_{I2B}\left(\frac{dw_I}{dt}\right)_I dt + \Omega_{B,t}(a_B - C_{I2B}\dot{w}_I)_t\frac{\Delta t^2}{2}\right]^T$$
$$(a_B - C_{I2B}\dot{w}_I)_{t-\Delta t} ==$$
$$\left[v_{B,t} + \Omega_{B,t} v_{B,t}\Delta t + \Omega_{B,t}\Omega_{B,t} v_{B,t}\frac{\Delta t^2}{2}\right]^T (a_B - C_{I2B}\dot{w}_I)_{t-\Delta t} ==$$
$$V_{\infty,t}\hat{i}_{B,t}^T\left(I - \Omega_{B,t}\Delta t + \Omega_{B,t}^2\frac{\Delta t^2}{2}\right)(a_B - C_{I2B}\dot{w}_I)_{t-\Delta t}$$

Considering a constant wind within the time interval, and thus a zero wind acceleration, the formulas respectively become:

$$V_{\infty,t-\Delta t}\dot{V}_{\infty,t-\Delta t} + \left[\int_{t-\Delta t}^{t} a_B dt + \Omega_{B,t} a_{B,t}\frac{\Delta t^2}{2}\right]^T a_{B,t-\Delta t} ==$$
$$V_{\infty,t}\hat{i}_{B,t}^T\left(I - \Omega_{B,t}\Delta t + \Omega_{B,t}^2\frac{\Delta t^2}{2}\right)a_{B,t-\Delta t}$$

and $$V_{\infty,t-\Delta t}\dot{V}_{\infty,t-\Delta t} + \left[\int_{t-\Delta t}^{t} a_B dt\right]^T a_{B,t-\Delta t} == V_{\infty,t}\hat{i}_{B,t}^T(I - \Omega_{B,t}\Delta t)a_{B,t-\Delta t}$$

It is therefore possible to define a system of two time domain equations and two unknowns i.e. angles of attack and sideslip included explicitly in the versor $\hat{i}_{B,t}$ at time t, that considering the above mentioned first approximation, is:

$$SYS1\begin{cases} \dot{V}_{\infty,t} = \hat{i}_{B,t}^T a_{B,t} \\ V_{\infty,t-\Delta t}\dot{V}_{\infty,t-\Delta t} + \left[\int_{t-\Delta t}^{t} a_B dt\right]^T a_{B,t-\Delta t} = V_{\infty,t}\hat{i}_{B,t}^T (I - \Omega_{B,t}\Delta t)a_{B,t-\Delta t} \end{cases}$$

Wherein all other parameters are either measurable at time t or are already calculated at time t−Δt. It is important to note that first formula in SYS 1 is EQ 1 written in a different form.

In the non-linear form, the system may for example be solved by a Levenberg Marquardt method or another equivalent method.

Alternatively, it is possible to linearize the trigonometric functions:

$$\hat{i}_B^T \approx [1,\beta,\alpha]^T$$

In this manner, the above mentioned system can be approximated and expressed as:

$$\begin{cases} A_0 = \hat{i}_{B,t}^T b_0 \\ A_0 = \hat{i}_{B,t}^T b_1 \end{cases}$$

wherein:

$A_0 = \dot{V}_{\infty,t}$, $$A_1 = \frac{V_{\infty,t-\Delta t}\dot{V}_{\infty,t-\Delta t} + \left[\int_{t-\Delta t}^{t} a_B dt\right]^T a_{B,t-\Delta t}}{V_{\infty,t}},$$

$b_0 = a_{B,t}$ and $b_1 = (I - \Omega_{B,t}\Delta t)a_{B,t-\Delta t}$

Expliciting the aerodinamic angles, the system becomes:

$$\begin{cases} A_0 - b_{0x} = b_{0z}\alpha + b_{0y}\beta \\ A_1 - b_{1x} = b_{1z}\alpha + b_{1y}\beta \end{cases}$$

and solutions are:

$$\begin{cases} \alpha = \frac{\begin{vmatrix} A_0 - b_{0x} & b_{0y} \\ A_1 - b_{1x} & b_{1y} \end{vmatrix}}{\begin{vmatrix} b_{0z} & b_{0y} \\ b_{1x} & b_{1y} \end{vmatrix}} \\ \beta = \frac{\begin{vmatrix} b_{0z} & A_0 - b_{0x} \\ b_{1z} & A_1 - b_{1x} \end{vmatrix}}{\begin{vmatrix} b_{0z} & b_{0y} \\ b_{1x} & b_{1y} \end{vmatrix}} \end{cases}$$

Figure 2:
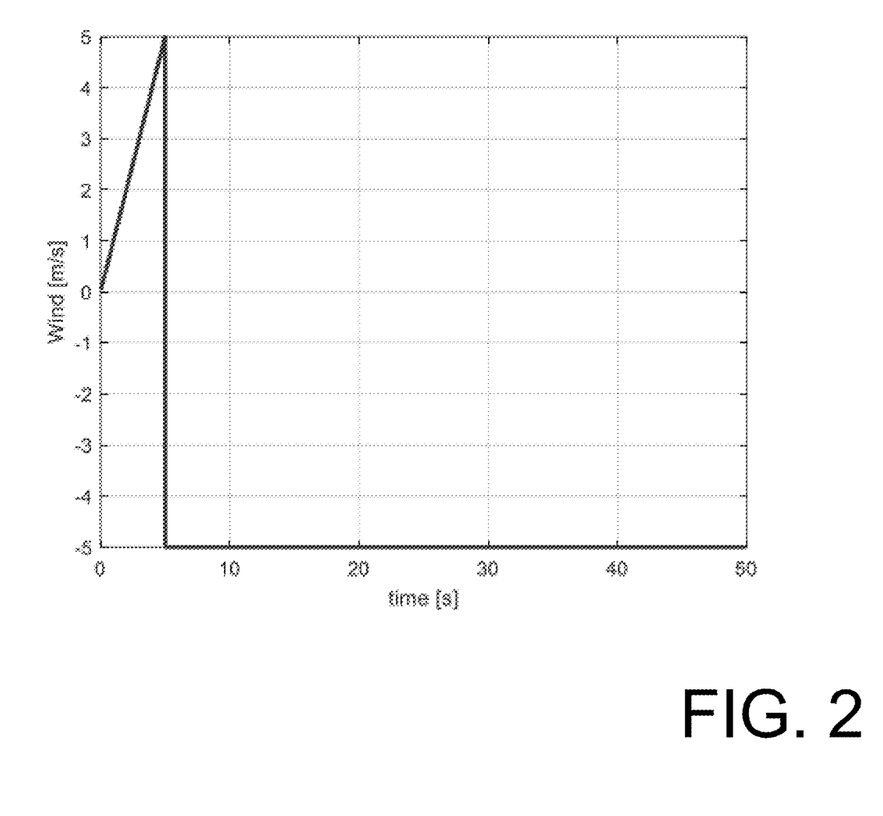
FIG. 2: a wind variation diagram.
Figure 4A:
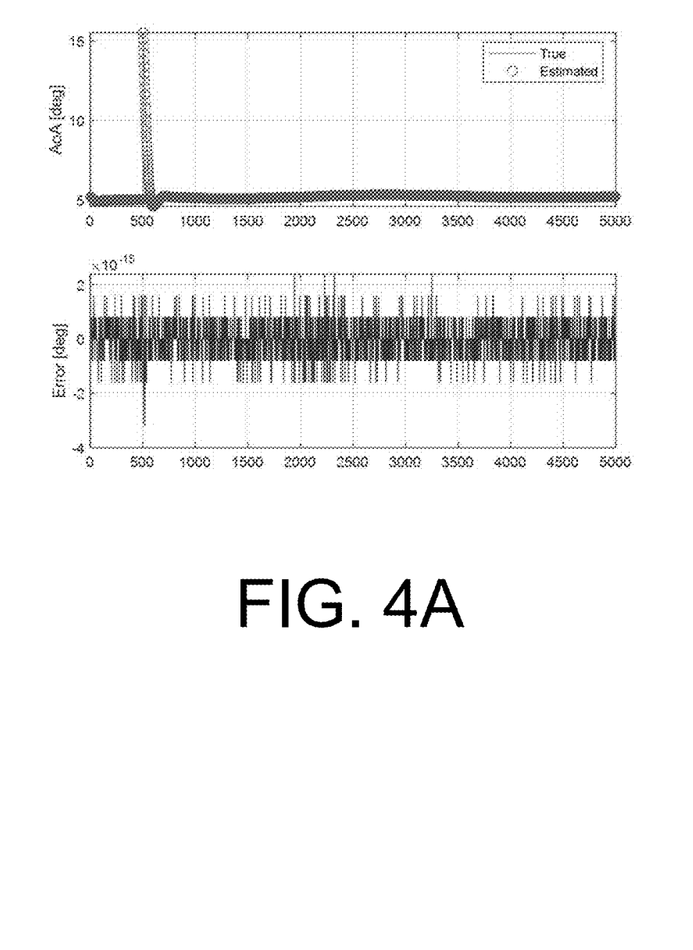
FIG. 4A: graphs showing the overlap between the theoretical results (solid line) and the numerical results according to the present invention (circles) for a first solution form.
Figure 4B:
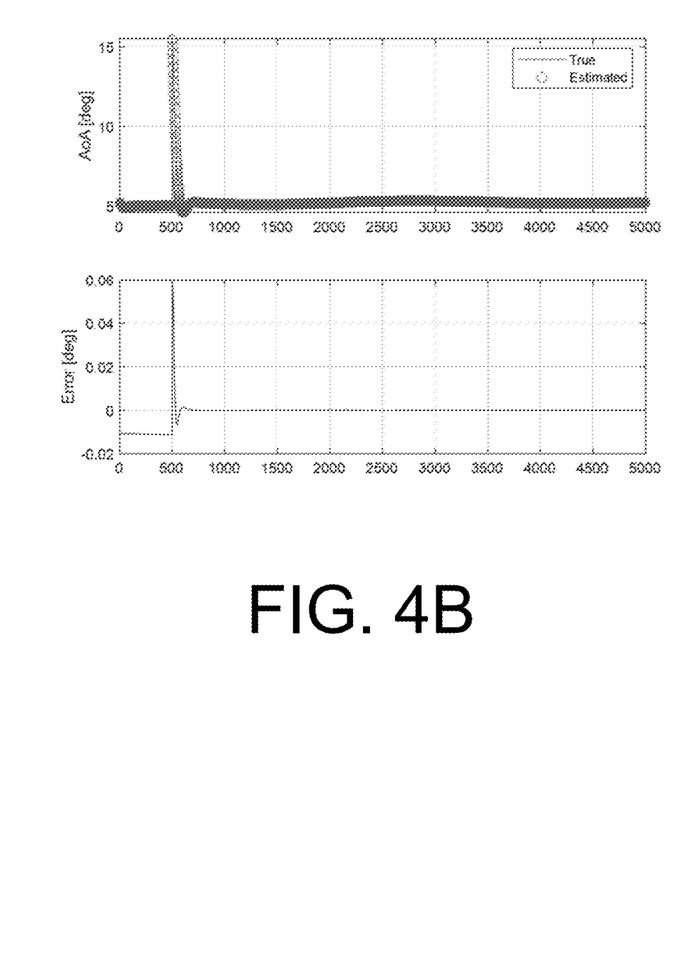
FIG. 4B: graphs showing the overlap between the theoretical results (solid line) and the numerical results according to the present invention (circles) for a second solution form.

FIGS. 4A and 4B show on the left the overlap between the nonlinear solution for the angle of attack (solid line) with the solution of the non-linear system. On the right there is instead the overlap with the results of the linearized system: the error of a few tenths of a degree is widely acceptable because it is lower than the errors produced by the actual systems for measuring these angles by at least one order of magnitude. In both cases, the wind variation law illustrated in FIG. 2 is applied.

According to another embodiment of the present invention, the SYS can be expanded forward and/or backward in time adding as many equations as necessary to achieve the required estimation accuracy. It is therefore possible to define a system of n+1 equations and two unknowns, i.e. angles of attack and sideslip included explicitly in the versor $\hat{i}_{B,t}$ at time t, that considering the above mentioned first approximation, is:

$$SYS2\begin{cases} \dot{V}_{\infty,t} = \hat{i}_{B,t}^T a_{B,t} \\ \dot{V}_{\infty,t-\Delta t}V_{\infty,t-\Delta t} + \left[\int_{t-\Delta t}^{t} a_B dt\right]^T a_{B,t-\Delta t} = V_{\infty,t}\hat{i}_{B,t}^T (I - \Omega_{B,t}\Delta t)a_{B,t-\Delta t} \\ \vdots \\ \dot{V}_{\infty,t-n\Delta t}V_{\infty,t-n\Delta t} + \left[\int_{t-n\Delta t}^{t} a_B dt\right]^T a_{B,t-n\Delta t} = \\ V_{\infty,t}\hat{i}_{B,t}^T (I - \Omega_{B,t}\Delta t)a_{B,t-n\Delta t} \end{cases}$$

Wherein all other parameters are either measurable at time t or are already calculated at time t−Δt, t−2Δt, . . . ,t−nΔt.

According to an embodiment of EQ 1 where coordinate acceleration and raw aerodynamic angles are given, it is possible to estimate $\dot{V}_\infty$ via EQ1:

$\dot{V}_\infty = a_X \cos\tilde{\beta}\cos\tilde{\alpha} + a_Y \sin\tilde{\beta} + a_Z \cos\tilde{\beta}\sin\tilde{\alpha}$ where $\tilde{\alpha}$ and $\tilde{\beta}$ are raw measures of $\alpha$ and $\beta$ respectively or $\tilde{\alpha}$ is the measure of $\alpha$ and $\tilde{\beta}$ is an approximation of $\beta$ or vice versa. Then the estimated $\dot{V}_\infty$ is used in SYS1 or SYS2 to refine the aerodynamic angle estimations.

Finally, it is clear that it is possible to make changes or variations to the method described and illustrated here without departing from the scope of protection as defined by the attached claims.

What is claimed is:

1. A method for estimating an angle of attack (α) and/or an angle of sideslip (β) of a flying body comprising:
measuring a speed of the flying body with respect to air with at least one airspeed sensor and determining a time derivative of the speed of the flying body with respect to the air ($\dot{V}_\infty$);
obtaining measurements of an acceleration of the flying body, including determining coordinate acceleration components ($a_x$, $a_y$, $a_z$) on a Cartesian reference frame fixed to the flying body; and
calculating the angle of attack and the angle of sideslip based on a mathematical relationship between the angle of attack and the angle of sideslip with the coordinate acceleration components and the time derivative of the speed of the flying body with respect to the air, wherein after linearization the mathematical relationship solved for the angle of attack ($\alpha_{lin}$) is as follows:

$$\alpha_{lin} = \frac{\dot{V}_\infty - a_X\cos\beta - a_Y\sin\beta}{a_Z\cos\beta},$$

and wherein after linearization the mathematical relationship solved for the angle of sideslip ($\beta_{lin}$) is as follows:

$$\cdot\beta_{lin} = \frac{\dot{V} - (a_X\cos\alpha) - (a_Z\sin\alpha)}{a_Y};$$

outputting the angle of attack and the angle of sideslip, wherein the calculating of the angle of attack and the angle of sideslip is are determined independent of flight control commands and are determined independent of the mass of the flying body;

measuring the angle of attack and the angle of sideslip by a measuring device;

comparing the measured angle of attack and the angle of sideslip with the solved for the angle of attack ($\alpha_{lin}$) and solved for the angle of sideslip ($\beta_{lin}$); and generating a warning signal when a difference between the measured angle of attack and the and the solved for the angle of attack ($\alpha_{lin}$) exceeds a predetermined limit, and a difference between the measured angle of sideslip and the solved for angle of sideslip ($\beta_{lin}$) exceeds a predetermined limit.

* * * * *